United States Patent
Sato

(10) Patent No.: US 11,261,929 B2
(45) Date of Patent: Mar. 1, 2022

(54) ABNORMALITY DIAGNOSIS METHOD, ABNORMALITY DIAGNOSIS APPARATUS, AND NON-TRANSITORY COMPUTER RECORDING MEDIUM

(71) Applicant: TOYOTA JIDOSHA KABUSHIKI KAISHA, Toyota (JP)

(72) Inventor: Shun Sato, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 210 days.

(21) Appl. No.: 16/567,552

(22) Filed: Sep. 11, 2019

(65) Prior Publication Data

US 2020/0096068 A1    Mar. 26, 2020

(30) Foreign Application Priority Data

Sep. 21, 2018 (JP) .............................. JP2018-177482

(51) Int. Cl.
*F16D 66/00* (2006.01)
*B25J 19/00* (2006.01)
(Continued)

(52) U.S. Cl.
CPC .......... *F16D 66/00* (2013.01); *B25J 19/0004* (2013.01); *G01L 5/284* (2013.01); *B60T 17/221* (2013.01); *F16D 2066/006* (2013.01)

(58) Field of Classification Search
CPC ..... B25J 19/004; B25J 9/1674; B60T 17/221; F16D 2066/006; F16D 66/00; G01L 5/284

See application file for complete search history.

(56) References Cited

U.S. PATENT DOCUMENTS 10,016,895 B2    7/2018 Monreal et al.
10,454,401 B2 *  10/2019 Ono ........................ H02P 6/28
(Continued)

FOREIGN PATENT DOCUMENTS

CN    101224831 A      7/2008
CN    106246765 A  *  12/2016
(Continued)

OTHER PUBLICATIONS

English translation of CN 106246765 specification. accessed from espacenet.com Jun. 8, 2021.*

*Primary Examiner* — Nimeshkumar D Patel
*Assistant Examiner* — Jean F Morello
(74) *Attorney, Agent, or Firm* — Sughrue Mion, PLLC

(57) ABSTRACT

An abnormality diagnosis method that diagnoses abnormality of a braking unit included in a prescribed apparatus that includes: the braking unit including a pressing member, an urging member that urges the pressing member toward an actuator, and an attraction device that releases an urging state of the pressing member that is pressed by the urging member; and a controller configured to control braking by the braking unit and that changes operation programs each including a plurality of operation steps, based on an attraction time period when the pressing member is separated from the actuator to release braking. The abnormality diagnosis method includes: a step of the prescribed apparatus calculating the attraction time period when the prescribed apparatus executes prescribed operation steps associated with corresponding operation programs; and a step of diagnosing abnormality of the braking unit based on the calculated attraction time period.

10 Claims, 5 Drawing Sheets

(51) Int. Cl.
*G01L 5/28* (2006.01)
*B60T 17/22* (2006.01)

(56) References Cited

U.S. PATENT DOCUMENTS

| | | | | |
|---|---|---|---|---|
| 10,994,412 B2* | 5/2021 | Oyama | ................... | F16D 55/06 |
| 2008/0156594 A1* | 7/2008 | Kobayashi | .............. | F16D 59/02 |
| | | | | 188/72.3 |
| 2016/0221192 A1 | 8/2016 | Monreal et al. | | |
| 2016/0279794 A1 | 9/2016 | Inagaki et al. | | |
| 2017/0243339 A1 | 8/2017 | Yamamoto et al. | | |

FOREIGN PATENT DOCUMENTS

| | | |
|---|---|---|
| CN | 2017-144532 A | 8/2017 |
| JP | 9-210106 A | 8/1997 |
| JP | 2014-217901 A | 11/2014 |
| JP | 2016-179527 A | 10/2016 |
| JP | 2017-185595 A | 10/2017 |

\* cited by examiner

| Prg | Step | THIRD EVALUATION VALUE | Prg-Recode |
|---|---|---|---|
| 2 | 4 | 11 | 2017/05/06 |
| 12 | 2 | 10 | 2018/03/12 |
| 2 | 6 | 10 | 2015/07/23 |
| 1 | 14 | 11 | 2017/12/10 |
| ⁝ | ⁝ | ⁝ | ⁝ |
| 10 | 2 | 5 | 2017/11/20 |

ABNORMALITY DIAGNOSIS METHOD, ABNORMALITY DIAGNOSIS APPARATUS, AND NON-TRANSITORY COMPUTER RECORDING MEDIUM

INCORPORATION BY REFERENCE

The disclosure of Japanese Patent Application No. 2018-177482 filed on Sep. 21, 2018 including the specification, drawings and abstract is incorporated herein by reference in its entirety.

BACKGROUND

1. Technical Field

The present disclosure relates to an abnormality diagnosis method, an abnormality diagnosis apparatus, and a non-transitory computer recording medium for diagnosing abnormality of a prescribed apparatus.

2. Description of Related Art

There is disclosed, for example, a robot that attracts a pressing part toward an exciting coil against biasing force of a spring and separates the pressing part from a friction plate so as to release braking (see Japanese Patent Application Publication No. 2017-185595 (JP 2017-185595 A)). The robot determines abnormality of a braking unit based on an attraction time period of the pressing part.

SUMMARY

For example, robots, or the like, perform operation by switching a plurality of operation programs. The accuracy of an attraction time period varies attributed to individual difference, attitude difference, or the like, of the robots, and depending on which operation step the attraction time period is calculated in an operation program. Therefore, depending on which operation step that the attraction time period is calculated, the accuracy of the attraction time period may deteriorate, which may lead to a difficulty in performing abnormality diagnosis of the braking unit with high accuracy.

The present disclosure provides an abnormality diagnosis method, an abnormality diagnosis apparatus, and a non-transitory computer recording medium, capable of performing abnormality diagnosis of the braking unit with high accuracy.

A first aspect of the present disclosure provides an abnormality diagnosis method of diagnosing, with an abnormality diagnosis apparatus, abnormality of a braking unit included in a prescribed apparatus. The prescribed apparatus includes the braking unit and a controller. The braking unit includes a pressing member, an urging member that urges the pressing member toward an actuator, and an attraction device that releases an urging state of the pressing member that is pressed by the urging member. The controller is configured to control braking by the braking unit. The prescribed apparatus is configured to change operation programs each including a plurality of operation steps. The abnormality diagnosis method includes: calculating, by the abnormality diagnosis apparatus, an attraction time period when the prescribed apparatus executes prescribed operation steps associated with corresponding operations; and diagnosing, by the abnormality diagnosis apparatus, abnormality of the braking unit based on the calculated attraction time period. The attraction time period is a period of time during which the attraction device attracts the pressing member.

The abnormality diagnosis method may further includes: calculating, by the abnormality diagnosis apparatus, the attraction time period when each of the operation steps in each of the operation programs is executed; calculating, by the abnormality diagnosis apparatus, an evaluation value for evaluating accuracy of the calculated attraction time period; and associating, by the abnormality diagnosis apparatus, as the prescribed operation step, the operation step highest in evaluation value, among calculated evaluation values in each of the operation steps included in each of the operation programs, with the corresponding operation program.

In the abnormality diagnosis method, when a prescribed number or more of the attraction time periods are calculated for each of the operation steps in each of the operation programs, the evaluation values of the attraction time periods may be calculated by the abnormality diagnosis apparatus.

In the abnormality diagnosis method, when the prescribed apparatus repeats the operation steps in each of the operation programs, the attraction time periods for each of the operation steps may be calculated by the abnormality diagnosis apparatus. The evaluation values of the attraction time periods may be calculated by the abnormality diagnosis apparatus based on a variance of the calculated attraction time periods and on a normal ratio of normal attraction time periods to all the calculated attraction time periods.

In the abnormality diagnosis method, the evaluation value of the attraction time period for each of the operation steps may be calculated by the abnormality diagnosis apparatus, based on an evaluation value based on the variance and the normal ratio of the attraction time periods, and at least one of: an evaluation value based on a change amount of a command value to the actuator during the attraction time period; and an evaluation value based on the number of the attraction time periods repeatedly calculated for each of the operation steps in each of the operation programs.

In the abnormality diagnosis method, the evaluation value of the attraction time period may be calculated, by the abnormality diagnosis apparatus, by multiplying the evaluation value based on the variance of the attraction time periods, the evaluation value based on the normal ratio of the attraction time periods, the evaluation value based on the change amount of the command value, and the evaluation value based on the number of the attraction time periods by prescribed weighting factors set for respective evaluation values, and adding results of the multiplication.

The abnormality diagnosis method may further includes: diagnosing, by the abnormality diagnosis apparatus, an abnormality sign of the braking unit based on the attraction time period, and storing, by the abnormality diagnosis apparatus, the diagnostic result of the abnormality sign; comparing, by the abnormality diagnosis apparatus, the diagnostic result of the abnormality sign with actual abnormality occurring in the braking unit; and changing, by the abnormality diagnosis apparatus, at least one of: the weighting factors of the evaluation values; and the evaluation method, such that a difference between the diagnostic result of the abnormality sign and the actual abnormality decreases.

The abnormality diagnosis method may further includes: storing, by the abnormality diagnosis apparatus, a failure mode indicating a type of the diagnosed abnormality of the braking unit; and setting, by the abnormality diagnosis apparatus, at least one of: the weighting factors of the evaluation values; and the evaluation method, based on the failure mode that is stored the most.

The abnormality diagnosis method may further include associating, by the abnormality diagnosis apparatus, each of the operation programs with the corresponding failure mode indicating the type of the abnormality of the braking unit and the corresponding prescribed operation step.

In the abnormality diagnosis method, the prescribed apparatus may communicably be connected, through a network, with the abnormality diagnosis apparatus that diagnoses abnormality of the braking unit included in the prescribed apparatus based on the attraction time period.

The abnormality diagnosis method wherein the attraction time period may be calculated, by the abnormality diagnosis apparatus, based on a command current value output to the actuator from the controller.

A second aspect of the present disclosure provides an abnormality diagnosis apparatus that diagnoses abnormality of a braking unit included in a prescribed apparatus. The braking unit includes a pressing member, an urging member that urges the pressing member toward an actuator, and an attraction device that releases an urging state of the pressing member that is pressed by the urging member. The prescribed apparatus includes: the braking unit; and a controller configured to control braking by the braking unit. The prescribed apparatus is configured to change operation programs each including a plurality of operation steps. The abnormality diagnosis apparatus includes a processor configured to calculate an attraction time period when the prescribed apparatus executes prescribed operation steps associated with corresponding operation programs. The processor is configured to diagnose abnormality of the braking unit based on the calculated attraction time period. The attraction time period is a period of time during which the attraction device attracts the pressing member.

In the abnormality diagnosis apparatus, the processor may be configured to calculate the attraction time period based on a command current value output to the actuator from the controller.

The third aspect of the present disclosure provides a non-transitory computer recording medium for recording a method executed by a computer to perform abnormality diagnosis for diagnosing abnormality of a braking unit included in a prescribed apparatus. The braking unit includes a pressing member, an urging member that urges the pressing member toward an actuator, and an attraction device that releases an urging state of the pressing member that is pressed by the urging member. The prescribed apparatus includes: the braking unit; and a braking controller configured to control braking by the braking unit. The prescribed apparatus is configured to change operation programs each including a plurality of operation steps. The method includes: calculating an attraction time period when the prescribed apparatus executes prescribed operation steps associated with corresponding operation programs; and diagnosing abnormality of the braking unit based on the calculated attraction time period. The attraction time period is a period of time during which the attraction device attracts the pressing member.

In the non-transitory computer recording medium, the attraction time period may be calculated based on a command current value output to the actuator from the controller.

The above configuration makes it possible to provide an abnormality diagnosis method, an abnormality diagnosis apparatus, and a non-transitory computer recording medium, capable of performing abnormality diagnosis of a braking unit with high accuracy.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

An embodiment of the present disclosure will be described below with reference to the drawings. An abnormality diagnosis apparatus according to a first embodiment of the present disclosure is mounted, for example, on a robot to diagnose abnormality of the robot. The robot includes a robot arm, a legged robot, and a humanoid robot.

Figure 1:
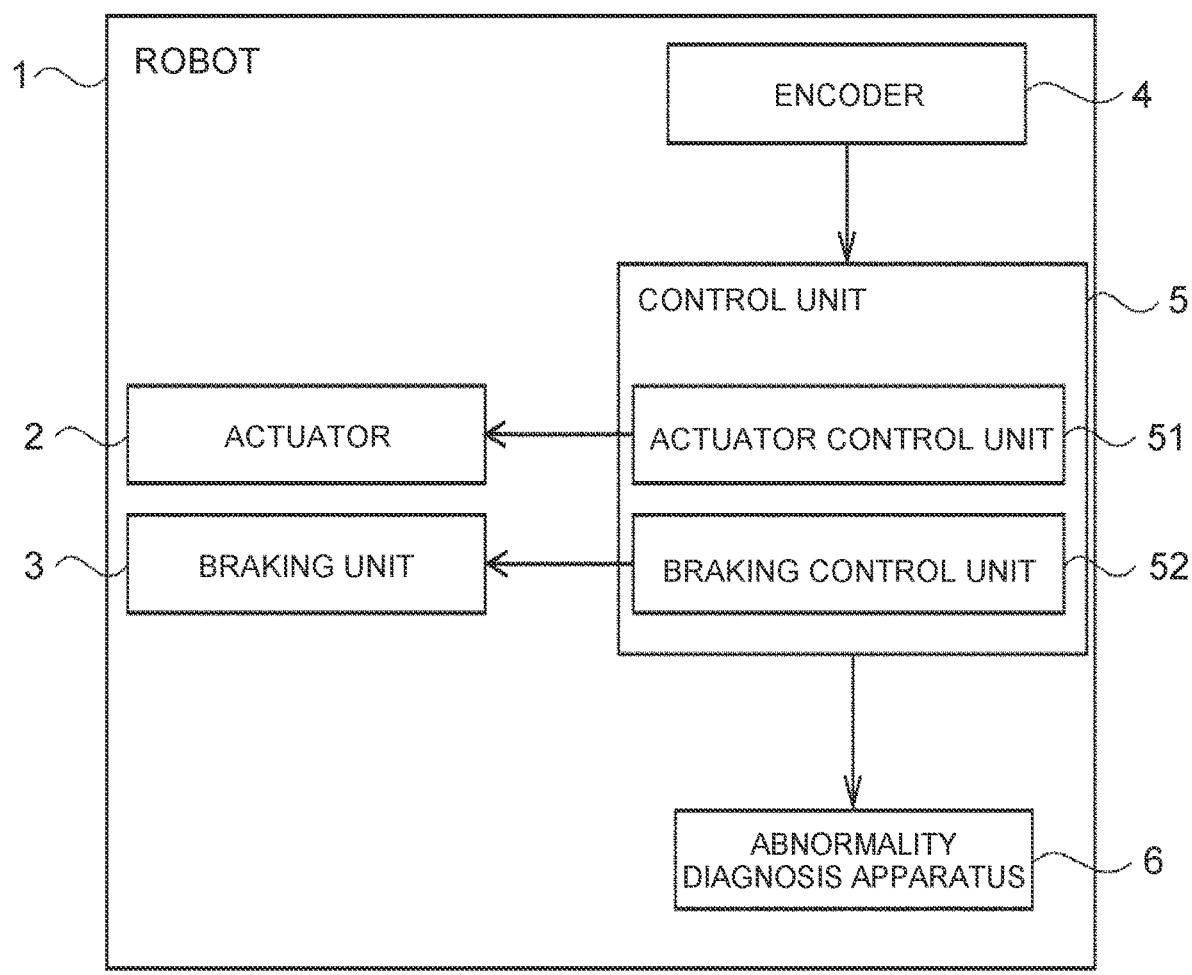
FIG. 1 is a block diagram showing the schematic system configuration of a control device according to a first embodiment of the present disclosure.

FIG. 1 is a block diagram showing the schematic system configuration of the robot according to the first embodiment. A robot 1 according to the first embodiment includes an actuator 2 that rotationally drives joint parts of the robot 1, a braking unit 3 that brakes the actuator 2, an encoder 4 that detects rotation of the actuator 2, and a control unit 5 that controls the actuator 2 and the braking unit 3.

The actuator 2 is a servomotor, for example. The actuator 2 is provided in joint parts, such as a wrist joint, a cubital joint, and a shoulder joint of the robot 1, to rotationally drive each of the joint units. The actuator 2 has a rotary shaft 22 that is coupled to a rotary part 21, and the rotary part 21 rotates with the rotary shaft 22 (FIG. 2).

The braking unit 3 brings an armature 31 into contact with the rotary part 21 of the actuator 2, and presses the armature 31 to the rotary part 21 to generate frictional force between the rotary part 21 and the armature 31. The braking unit 3 uses the frictional force to brake the actuator 2. The armature 31 is a specific example of a pressing member. The braking unit 3 releases braking of the actuator 2 by separating the armature 31 from the rotary part 21 of the actuator 2.

Figure 2:
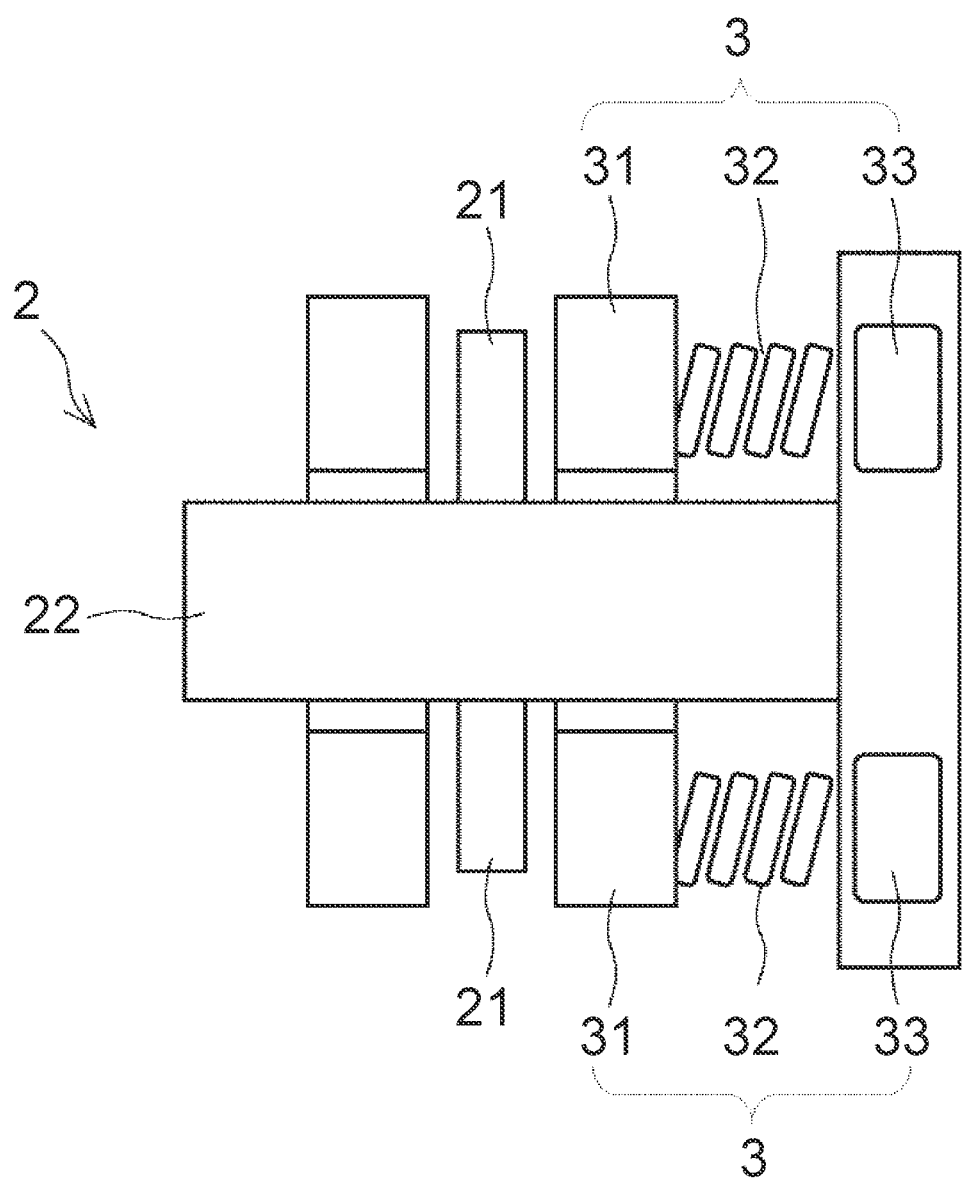
FIG. 2 shows schematic configuration of a braking unit.

FIG. 2 shows the schematic configuration of the braking unit. The braking unit 3 includes the armature 31 that comes into contact with the rotary part 21 of the actuator 2, a spring member 32 that urges the armature 31, and a magnet coil 33 that attracts the armature 31. The spring member 32 is a specific example of an urging member. The magnet coil 33 is a specific example of an attraction device.

The spring member 32 of the braking unit 3 urges the armature 31 toward the rotary part 21 so as to press the armature 31 to the rotary part 21. The magnet coil 33 attracts the armature 31 toward the magnet coil 33 against urging by the spring member 32, so that the armature 31 is separated from the rotary part 21.

The braking unit 3 releases the braking of the actuator 2 by magnetizing the magnet coil 33 so as to attract the armature 31, separate the armature 31 from the rotary part 21, and return the armature 31 to a prescribed position, in response to a braking release signal from the control unit 5. For example, a stopper, or the like, is provided at a position in a prescribed distance from the magnet coil 33. The prescribed position is mechanically determined by the stopper.

The braking unit 3 stops attraction with the magnet coil 33 in response to a braking signal from the control unit 5. As a consequence, the armature 31 is pressed toward the rotary part 21 by the urging force of the spring member 32, and the rotary part 21 of the actuator 2 is braked.

The encoder 4 detects a rotation angle of the rotary shaft 22 of the actuator 2, and outputs the detected rotation angle to the control unit 5. The actuator 2, the encoder 4, and the braking unit 3 may integrally be configured.

The control unit 5 includes an actuator control unit 51 which controls the actuator 2, and the braking control unit 52 which controls the braking unit 3. The actuator control unit 51 performs feedback control of the actuator 2, for example.

The actuator control unit 51 generates a command current value for controlling the actuator 2, based on a command value for controlling the robot 1 and on the rotation angle from the encoder 4. The actuator control unit 51 outputs the generated command current value to the actuator 2. The actuator 2 is rotationally driven in response to the command current value from the actuator control unit 51.

The braking control unit 52 outputs a braking signal that triggers braking to the braking unit 3. The braking unit 3 brakes the actuator 2 in response to the braking signal from the braking control unit 52. Meanwhile, the braking control unit 52 outputs a braking release signal that triggers braking release to the braking unit 3. The braking unit 3 releases the braking of the actuator 2 in response to the braking release signal from the braking control unit 52.

When the actuator 2 is not in operation, the braking unit 3 brakes the actuator 2 and maintains the posture of the robot 1. This makes it possible to prevent self-weight falling, or the like, of the robot 1. The posture of the robot 1 is changed from the state where the actuator 2 is braked.

In the case of changing the posture of the robot 1, the control unit 5 first outputs a braking release signal to the braking unit 3 so as to control the magnet coil 33 of the braking unit 3 such that the armature 31 is separated from the rotary part 21, and returned to a prescribed position, by which the braking of the actuator 2 is released.

In a braking release period until the armature 31 is separated from the rotary part 21 and returned to a prescribed position after the control unit 5 outputs a braking release signal to the braking unit 3, the control unit 5 controls the actuator 2 based on the rotation angle from the encoder 4, and performs gravity compensation control to temporarily maintain a current rotational position of the joint part of the robot 1. Then, the control unit 5 changes the posture of the robot 1 by controlling the actuator 2 to drive the joint part of the robot 1.

Figures 3, 4:
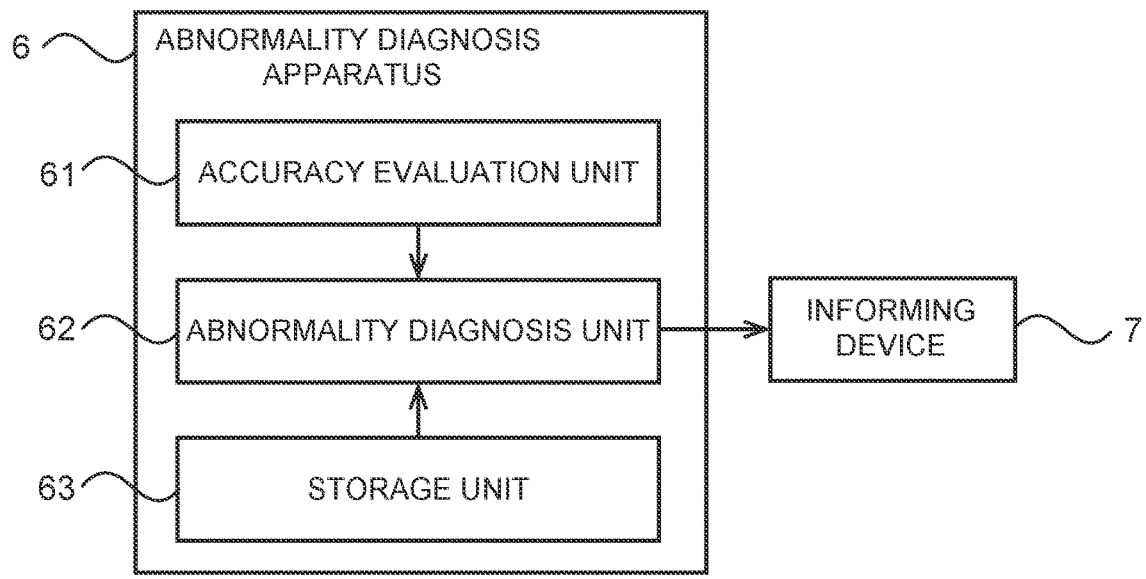
FIG. 3 is a block diagram showing the schematic system configuration of an abnormality diagnosis apparatus according to the first embodiment.
FIG. 4 shows one example of a priority list.

FIG. 3 is a block diagram showing the schematic system configuration of an abnormality diagnosis apparatus 6 according to the first embodiment. The abnormality diagnosis apparatus 6 according to the first embodiment includes an accuracy evaluation unit 61 which evaluates the accuracy of an attraction time period, an abnormality diagnosis unit 62 which diagnoses abnormality of the braking unit 3, and a storage unit 63.

The abnormality diagnosis apparatus 6 has a hardware configuration mainly formed from a microcomputer that includes, for example, a central processing unit (CPU) which performs arithmetic processes or the like, memories including a read only memory (ROM) which stores arithmetic programs, or the like, executed by the CPU, and a random access memory (RAM), and an interface unit (IF) through which signal input and output are performed. The abnormality diagnosis apparatus 6 is an example of a processor. The CPU, the memories, and the interface unit are connected with each other through a data bus or the like.

For example, as shown in FIG. 2, when the rotary part 21 is worn out by a friction between the armature 31 and the rotary part 21 at the time of braking, the armature 31 needs to move more toward the rotary part 21 at the time when the armature 31 brakes the rotary part 21. Therefore, the urging force of the spring member 32 which presses the armature 31 toward the rotary part 21 becomes insufficient, which causes the armature 31 to apply insufficient braking torque to the rotary part 21. As a consequence, what is called a braking slip occurs.

As described before, as the rotary part 21 is worn out, the armature 31 moves more toward the rotary part 21 when the armature 31 brakes the rotary part 21. An attraction time period (braking release period), in which the armature 31 in the above state is separated from the rotary part 21 by attraction of armature 31 toward the magnet coil 33 and returned to a prescribed position to release the braking, becomes longer than the attraction time period in the case where the rotary part 21 is not worn out.

Therefore, when, for example, the attraction time period is a prescribed time or longer, the abnormality diagnosis unit 62 diagnoses that the braking unit 3 is abnormal due to wear of the rotary part 21.

The abnormality diagnosis unit 62 calculates the attraction time period of the armature 31 based on a command current value output to the actuator 2 from the actuator control unit 51. The abnormality diagnosis unit 62 may calculate the attraction time period of the armature 31 based on a feedback current value of the command current value that is output to the actuator 2 from the actuator control unit 51.

For example, the abnormality diagnosis unit 62 calculates, as an attraction time period of the armature 31, a period of time until a command current value used for gravity compensation is output to the actuator 2 after a braking release signal is output from the braking control unit 52 to the braking unit 3.

Now, out of a plurality of stored operation programs, the robot 1 selects and executes various operation programs depending on, for example, processing targets. That is, the robot 1 performs operation, or the like, by switching the operation programs. The operation programs refer to the programs for implementing an overall operation purpose of the robot 1.

The accuracy of the attraction time period varies attributed to individual difference, posture, or the like, of the robot 1, and depending on which operation step the attraction time period is calculated in the operation programs. The operation steps refer to individual commands (such as move to a temporary stop position, stop temporarily, and move to an end position) that command subsequent actions within the overall operation purpose of the robot 1. Therefore, depending on which operation step the attraction time period is calculated, the accuracy of the attraction time period may deteriorate, which may lead to a difficulty in performing abnormality diagnosis of the braking unit 3 with high accuracy.

As a solution to this, the abnormality diagnosis unit 62 according to the first embodiment calculates an attraction time period when the robot 1 executes prescribed operation steps associated with corresponding operation programs, and diagnoses abnormality of the braking unit 3 based on the calculated attraction time period.

The operation programs are associated with corresponding prescribed operation steps in which the attraction time period is calculated at optimal timing with high accuracy. Accordingly, even when the robot 1 changes an operation program in accordance with processing targets, or the like, the attraction time period can still be calculated with high accuracy at optimal timing when the prescribed operation step that is associated with the changed operation program is executed. Therefore, the abnormality diagnosis unit 62 according to the first embodiment can diagnose abnormality of the braking unit 3 with high accuracy based on the calculated highly accurate attraction time period.

Description is now given of an example of a method for associating the operation programs with corresponding prescribed operation steps in which the attraction time period is calculated at optimal timing with high accuracy. The accuracy evaluation unit 61 associates the operation programs with corresponding prescribed operation steps in which the attraction time period is calculated at the optimal timing with high accuracy.

For example, the robot 1 stores an average of 100 (a maximum of 1000) operation programs. Accordingly, when a person actually performs measurement, or the like, of the attraction time period, and performs the above associating process, an enormous number of processes are required. In the case where the robot 1 stores a large number of operation programs as describe before, and some modifications, or the like, of the operation programs are made in particular, the number of processes become enormous. The accuracy evaluation unit 61 according to the first embodiment can automate the associating process, which leads to a considerable reduction in the number of processes.

For example, a process panel, or the like, instructs the robot 1 to repeat each of the operations steps a prescribed number of times or more in each of the operation programs. In that case, the accuracy evaluation unit 61 calculates the attraction time period at the time of braking in each of the operation steps. As described later, a value that allows calculation of a first evaluation value α and a second evaluation value β with sufficient accuracy is set in advance in the storage unit 63 as the prescribed number of times. The storage unit 63 is configured from the memory or the like, for example.

The accuracy evaluation unit 61 determines whether or not each of the calculated attraction time periods is a normal value, and calculates a detection ratio of the normal values. For example, the attraction time period is calculated earlier than the operating command to the actuator 2. Accordingly, when a command current value to the actuator 2, while the attraction time period is being calculated, is larger than a specified threshold, the accuracy evaluation unit 61 determines that the attraction time period is a normal value.

The accuracy evaluation unit 61 may compare the calculated attraction time period with a preset attraction time period at the normal state, and when a difference therebetween is equal to or less than a specified threshold, the accuracy evaluation unit 61 may determine that the attraction time period is a normal value. Hence, an abnormally long attraction time period due to the influence of noise or the like can be determined as abnormality. Values when the attraction time period is normal are experimentally obtained, and an optimum value based on the obtained values is set as the specified threshold in the storage unit 63.

The accuracy evaluation unit 61 calculates the normal value detection ratio (normal percentage) using a following expression:

Normal value detection ratio=the number of normal attraction time periods/the number of all the attraction time periods×100(%)

The accuracy evaluation unit 61 calculates a first evaluation value α1 of the attraction time period, based on the calculated normal value detection ratio.

For example, the normal value detection ratio and the first evaluation value α1 are associated with each other in the following table information. The table information is set in advance in the storage unit 63, or the like. The following normal value detection ratios are associated with optimal first evaluation values α1 which are experimentally obtained, for example.

| Normal value detection ratio | First evaluation value α1 |
| --- | --- |
| 0 to 50% | 0 |
| 50 to 70% | 1 |
| 70 to 90% | 2 |
| 90% or more | 3 |

The accuracy evaluation unit 61 calculates the first evaluation value α1 of the attraction time period, based on the calculated normal value detection ratio and the table information. For example, when the calculated normal value detection ratio is 60%, the accuracy evaluation unit 61 calculates, based on the table information, that the first evaluation value of the attraction time period α1 is 1.

Next, the accuracy evaluation unit 61 calculates a variance of the calculated attraction time periods. The accuracy evaluation unit 61 calculates a second evaluation value α2 of the attraction time period, based on the calculated variance. For example, when there is abnormality in a guide of the armature 31, the attraction time periods may vary. In this case, since the attraction time periods have a large variance, the second evaluation value α2 is calculated based on the variance as described above.

For example, the variance and the second evaluation value α2 are associated with each other in the following table information. The table information is set in advance in the storage unit 63, or the like. The following variances are associated with second evaluation values α2 which are experimentally obtained optimal values.

| Variance | Second evaluation value α2 |
| --- | --- |
| 2300 or more | 0 |
| 2300 to 1000 | 1 |
| 1000 to 256 | 2 |
| 256 or less | 3 |

The accuracy evaluation unit 61 calculates the second evaluation value α2 of the attraction time period based on the calculated variance and the table information. For example, when the calculated variance is 456, the accuracy evaluation unit 61 calculates, based on the table information, that the second evaluation value of the attraction time period $\alpha 2$ is 2. The accuracy evaluation unit 61 adds the first evaluation value $\alpha 1$ and the second evaluation value $\alpha 2$ of the calculated attraction time period to calculate a final third evaluation value $\alpha 3$ of the attraction time period. Thus, the third evaluation value $\alpha 3$ with higher accuracy can be calculated in consideration of the normal value detection ratio and the variance of the attraction time period.

The accuracy evaluation unit 61 may calculate the third evaluation value $\alpha 3$ of the attraction time period only when a prescribed number or more attraction time periods are calculated. When the attraction time period is evaluated with only the attraction time periods smaller in number than the prescribed number, evaluation with sufficient accuracy is difficult. Accordingly, if the third evaluation value $\alpha 3$ of the attraction time period is calculated only when a prescribed number or more attraction time periods are calculated, the accuracy of the evaluation value can be enhanced and thereby the accuracy of abnormality diagnosis can be enhanced.

As described before, the accuracy evaluation unit 61 calculates the third evaluation value $\alpha 3$ for each of the attraction time periods which are calculated when the operation steps in each of the operation programs are executed. A higher third evaluation value $\alpha 3$ indicates higher accuracy of the attraction time period.

The accuracy evaluation unit 61 further generates a priority list which lists the third evaluation values $\alpha 3$ of the attraction time period in the operation steps in each of the operation programs in descending order, as shown in FIG. 4, for example. The accuracy evaluation unit 61 associates, based on the priority list, the operation step highest in the third evaluation value $\alpha 3$ in each of the operation programs, with the corresponding operation program, as the prescribed operation step. This makes it possible to associate each of the operation programs with the corresponding prescribed operation step in which the attraction time period is calculated at optimal timing with high accuracy.

For example, in FIG. 4, the evaluation value of the attraction time period in an operation step St4 included in an operation program Prg2 is 11, which is the highest evaluation value. Therefore, the accuracy evaluation unit 61 associates the operation program Prg2 with the prescribed operation step St4. The abnormality diagnosis unit 62 can calculate the attraction time period with the highest accuracy, by calculating the attraction time period when the operation step St4 in the operation program Prg2 is executed.

When the operation step highest in the third evaluation value $\alpha 3$ is deleted due to a change in an operation program, the accuracy evaluation unit 61 may associate the operation program with an operation step, which is second highest in the third evaluation value $\alpha 3$ in the operation program, as the prescribed operation step, based on the priority list. For example, as shown in FIG. 4, when the operation step St4 highest in the third evaluation value $\alpha 3$ is deleted due to a change of the operation program Prg2, the accuracy evaluation unit 61 may associate the operation program Prg2 with an operation step St6 second highest in the third evaluation value $\alpha 3$ in the operation program Prg2, as the prescribed operation step, based on the priority list. Thus, even when there is a change in an operation program, the operation programs can easily be associated with corresponding prescribed operation steps in which the attraction time period is calculated at optimal timing with high accuracy, with use of the priority list.

As described before, the accuracy evaluation unit 61 stores in the storage unit 63 a timing list listing the operation programs in association with corresponding prescribed operation steps in which the attraction time period is calculated at the optimal timing with high accuracy.

The abnormality diagnosis unit 62 calculates the attraction time period with high accuracy based on the timing list stored in the storage unit 63, when the robot 1 executes the prescribed operation steps associated with corresponding operation programs. The abnormality diagnosis unit 62 diagnoses that the braking unit 3 is abnormal when the calculated attraction time period is a prescribed time or longer.

The method for diagnosing the abnormality of the braking unit 3 is merely an example, and is not restrictive. For example, the abnormality diagnosis unit 62 may diagnose that the braking unit 3 is abnormal, when a change amount of the evaluation value obtained by subtracting the third evaluation value $\alpha 3$ of the attraction time period from an initial evaluation value is equal to or larger than a prescribed value. The initial evaluation value is an evaluation value of the attraction time period at an early stage, when the braking unit 3 is determined to be normal.

When diagnosing that the braking unit 3 is abnormal, the abnormality diagnosis unit 62 may output an abnormality signal including an error code, or the like, to an informing device 7, for example. In response to the abnormality signal from the abnormality diagnosis unit 62, the informing device 7 may inform a user about the abnormality of the braking unit 3, that is, insufficiency of braking torque applied from the baking unit 3 to the actuator 2. Thus, the user can easily recognize the abnormality of the braking unit 3.

The informing device 7 is configured from, for example, a speaker which informs a user about the abnormality of the braking unit 3 by an alarm, a light which informs the user as an alarm lamp, or the like. The informing device 7 may be configured from a display which informs the user that a component of the braking unit 3, such as the rotary part 21 and the armature 31, needs to be replaced, and may also be configured by optionally combining these components. The user can restrain a collapse of the posture of the robot 1 by taking an action, such as replacement of the worn-out rotary part 21, or the like, in response to the information from the informing device 7.

When receiving an abnormality signal from the abnormality diagnosis unit 62, the actuator control unit 51 may perform control to brake the actuator 2. The actuator control unit 51 may stop driving of the actuator 2, when receiving the abnormality signal from the abnormality diagnosis unit 62. Furthermore, when receiving the abnormality signal from the abnormality diagnosis unit 62, the actuator control unit 51 may perform at least one of notifying the user, braking the actuator 2, and stopping the actuator 2.

Figure 5:
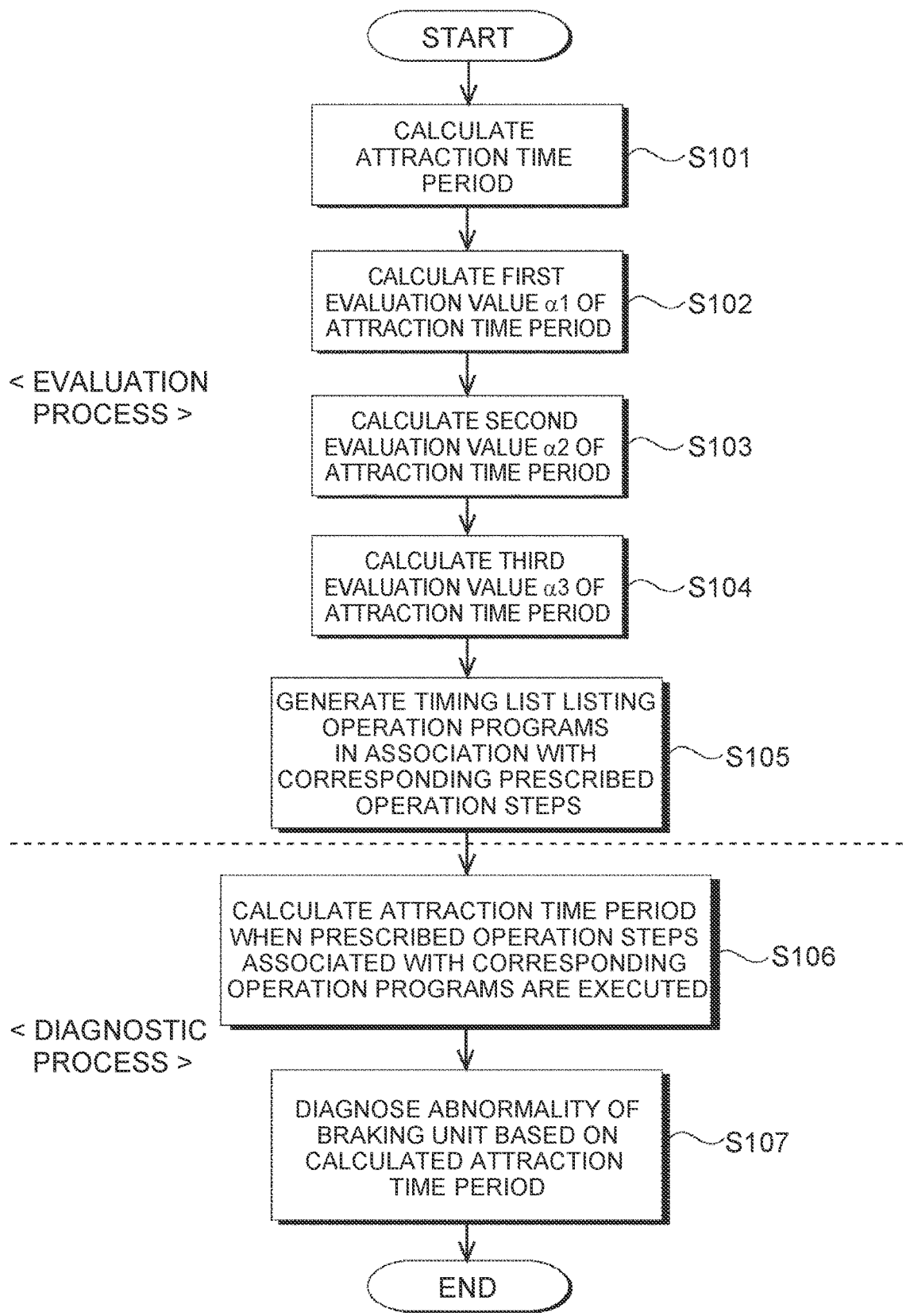
FIG. 5 is a flowchart of an abnormality diagnosis method according to the first embodiment.

FIG. 5 is a flowchart of an abnormality diagnosis method according to the present embodiment.

Evaluation Process

The accuracy evaluation unit 61 calculates the attraction time period at the time of braking in the operation steps in each of the operation programs (S101).

The accuracy evaluation unit 61 calculates a normal value detection ratio of each of the calculated attraction time periods, and calculates a first evaluation value $\alpha 1$ of each of the attraction time periods based on the calculated normal value detection ratio and the table information (S102).

The accuracy evaluation unit 61 calculates a variance of the calculated attraction time periods, and calculates a second evaluation value $\alpha 2$ of each of the attraction time periods based on the calculated variance (S103). The accuracy evaluation unit 61 adds the first evaluation value α1 and the second evaluation value α2 of each of the calculated attraction time periods, and calculates a final third evaluation value α3 of each of the attraction time periods (S104).

The accuracy evaluation unit 61 generates a timing list in which the operation step, which is highest in the third evaluation value α3 in each of the operation programs, is associated with the corresponding operation program, as the prescribed operation step (S105).

Diagnostic Process

The abnormality diagnosis unit 62 calculates the attraction time period with high accuracy based on the timing list, when the robot 1 executes prescribed operation steps associated with corresponding operation programs (S106).

The abnormality diagnosis unit 62 diagnoses abnormality of the braking unit 3 based on the calculated attraction time period (S107).

As described in the foregoing, in the first embodiment, the attraction time period is calculated when the robot 1 executes prescribed operation steps associated with corresponding operation programs, and the abnormality of the braking unit 3 is diagnosed based on the calculated attraction time period. The operation programs are associated with corresponding prescribed operation steps in which the attraction time period is calculated at optimal timing with high accuracy. Therefore, the attraction time period can be calculated with high accuracy at optimal timing when the prescribed operation steps associated with the corresponding operation programs are executed. Hence, the abnormality of the braking unit 3 can be diagnosed with high accuracy based on the calculated highly accurate attraction time period.

Second Embodiment

In the second embodiment, the abnormality diagnosis unit 62 may calculate a fourth evaluation value α4 which evaluates a command current value that is a difference in the command current value to the actuator 2 during the attraction time period. The command current value difference of the actuator 2 is a change amount in the command current value to the actuator 2 during the attraction time period, and also a difference between the command current values before and after starting the gravity compensation of the actuator 2. The command current value difference indicates how much the robot 1 moves (such as a fall amount).

The accuracy evaluation unit 61 calculates the command current value difference of the actuator 2 during the attraction time period until the command current value is output to the actuator 2 after a braking release signal is output from the braking control unit 52 to the braking unit 3.

The accuracy evaluation unit 61 calculates the fourth evaluation value α4 of the command current value difference, based on the command current value difference of the actuator 2. For example, the command current value difference and the fourth evaluation value α4 of the actuator 2 are associated with each other in table information. The table information is set in advance in the storage unit 63, or the like. The command current value difference of the actuator 2 is associated with the fourth evaluation value α4 that is experimentally obtained, for example.

The accuracy evaluation unit 61 adds the calculated fourth evaluation value α4 to the third evaluation value α3 to calculate a final fifth evaluation value α5. Thus, it is possible to calculate the fifth evaluation value α5 with higher accuracy in consideration of the command current value difference of the actuator 2 during the attraction time period, in addition to the aforementioned normal value detection ratio and variance of the attraction time period. With the fifth evaluation value α5, the operation programs can be associated with prescribed operation steps that offer more optimal timing.

The accuracy evaluation unit 61 generates a priority list which lists the fifth evaluation values α5 of the attraction time periods in the operation steps in each of the operation programs in descending order. Based on the priority list, the accuracy evaluation unit 61 associates the operation step, which is highest in the fifth evaluation value α5 in each of the operation programs, with the corresponding operation program, as the prescribed operation step. The accuracy evaluation unit 61 stores in the storage unit 63 a timing list including the operation programs in association with corresponding prescribed operation steps in which the attraction time period is calculated at the optimal timing with high accuracy. Thus, the attraction time period can be evaluated with higher accuracy, and thereby the attraction time period can also be calculated with higher accuracy.

The accuracy evaluation unit 61 may further calculate a sixth evaluation value α6 which evaluates the number of the attraction time periods calculated by repeating the operation steps for braking a prescribed number of times or more in each of the operation programs. The accuracy evaluation unit 61 may add the calculated sixth evaluation value to the fifth evaluation value α5 to calculate a final seventh evaluation value α7. Thus, it becomes possible to calculate the seventh evaluation value α7 with higher accuracy in consideration of the number of the attraction time periods, in addition to the aforementioned normal value detection ratio, variance, and command current value difference of the attraction time period. With the seventh evaluation value α7, the operation programs can be associated with prescribed operation steps that offer more optimal timing.

As the number of the attraction time periods in each operation step increases, the evaluation accuracy of the attraction time period increases. For example, the number of the attraction time periods and the sixth evaluation value α6 are associated with each other in the following table information. The table information is set in advance in the storage unit 63, or the like. The number of the attraction time periods below is each associated with an optimal sixth evaluation value α6 which is experimentally obtained, for example.

| The number of attraction time periods | Sixth evaluation value α6 |
|---|---|
| 1 | 0 |
| 2 | 1 |
| 3 | 2 |
| 4 or more | 3 |

The accuracy evaluation unit 61 calculates the sixth evaluation value α6 of the attraction time period based on the number of the attraction time periods and the table information. The accuracy evaluation unit 61 may add the calculated sixth evaluation value α6 to the third evaluation value α3 to calculate a final eighth evaluation value α8. Thus, it is possible to calculate the eighth evaluation value α8 with higher accuracy in consideration of the number of the attraction time periods, in addition to the aforementioned normal value detection ratio and variance of the attraction time period. With the eighth evaluation value α8, the operation programs can be associated with prescribed operation steps that offer more optimal timing.

The accuracy evaluation unit 61 may add weighted first evaluation value $\alpha 1$, second evaluation value $\alpha 2$, fourth evaluation value $\alpha 4$, and sixth evaluation value $\alpha 6$ to calculate the aforementioned third evaluation value $\alpha 3$, fifth evaluation value $\alpha 5$, seventh evaluation value $\alpha 7$, and eighth evaluation value $\alpha 8$. For example, the accuracy evaluation unit 61 multiplies the first evaluation value $\alpha 1$, the second evaluation value $\alpha 2$, the fourth evaluation value $\alpha 4$, and the sixth evaluation value $\alpha 6$ by prescribed weighting factors to weight each of the evaluation values.

For example, the accuracy evaluation unit 61 may calculate the fifth evaluation value $\alpha 5$, the seventh evaluation value $\alpha 7$, and the eighth evaluation value $\alpha 8$ by increasing the weighting factors of the first evaluation value $\alpha 1$ and the second evaluation value $\alpha 2$ which exert a larger influence on the accuracy of the attraction time period. Thus, in consideration of the degree of influence that each parameter exerts on the accuracy of the attraction time period, the evaluation value of the attraction time period can be calculated with higher accuracy. In the second embodiment, component members identical to those of the first embodiment will be designated by identical reference numeral to omit detailed description thereof.

Third Embodiment

Figure 6:
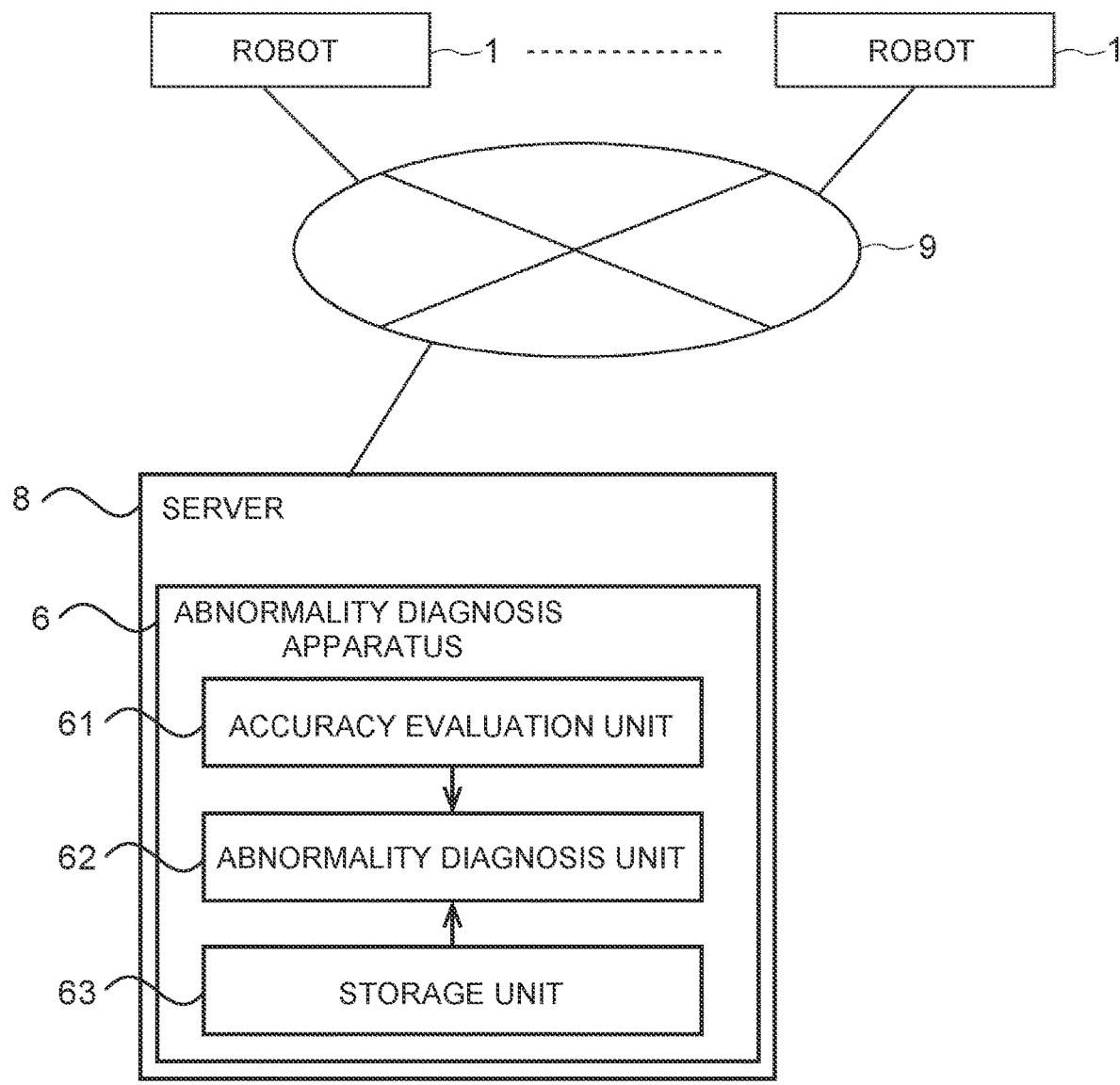
FIG. 6 is a block diagram showing the schematic system configuration of an abnormality diagnosis apparatus according to a third embodiment of the present disclosure.

In a third embodiment of the present disclosure, the abnormality diagnosis apparatus 6 may be configured to be mounted on a server that is away from the robot 1. FIG. 6 is a block diagram showing the schematic system configuration of an abnormality diagnosis apparatus according to the third embodiment.

For example, the abnormality diagnosis apparatus 6 is configured to be present on a cloud. Each of the robots 1 and a server 8 are communicably connected by radio or wirelessly through a network 9, such as the Internet. This makes it possible to distribute and reduce processing load applied to the robot 1.

Some processing functions of the abnormality diagnosis apparatus 6, such as at least one of the accuracy evaluation unit 61, the abnormality diagnosis unit 62, and the storage unit 63, may be present in the robot 1. Since only some of the functions of the abnormality diagnosis apparatus 6 are present in the robot 1, the processing load of the robot 1 can effectively be reduced.

The abnormality diagnosis unit 62 of the abnormality diagnosis apparatus 6 may diagnose a sign of future abnormality of the braking unit 3 which is highly likely to occur. The abnormality diagnosis unit 62 diagnoses the sign of abnormality of the braking unit 3 based on the attraction time period, and sequentially stores the diagnostic result of the abnormality sign in the storage unit 63. The abnormality diagnosis apparatus 6 may compare the diagnostic result of the abnormality sign with actual abnormality that occurs in the actual braking unit 3, and change at least one of: the weighting factors of the evaluation values; and the evaluation method, so as to decrease the difference.

For example, the abnormality diagnosis unit 62 may compare the diagnostic result of an abnormality sign with actual abnormality which occurs in the actual braking unit 3, change any one of the third evaluation value $\alpha 3$, the fifth evaluation value $\alpha 5$, the seventh evaluation value $\alpha 7$, and the eighth evaluation values $\alpha 8$ so as to eliminate the difference between the diagnostic result and the actual abnormality, and evaluate the attraction time period.

The abnormality diagnosis apparatus 6 may further compare the diagnostic result of an abnormality sign with actual abnormality that occurs in the actual braking unit 3, and change the evaluation value in the table information so as to decrease the difference.

The failure modes indicating the types of abnormality of the braking unit 3 include various abnormality of the braking unit 3, such as dragging abnormality of the braking unit 3 due to adhesion (brake dragging) of the armature 31, in addition to wear abnormality of the braking unit 3 due to wear of the rotary part 21, and guide abnormality of the braking unit 3 due to abnormality of the guide of the armature 31 as described before.

The storage unit 63 may be configured to sequentially store the mode of failure that occurs in the braking unit 3. The abnormality diagnosis unit 62 may change or set at least one of: the weighting factors of the evaluation values; the evaluation method; and the evaluation values in the table information, based on the failure mode stored the most in the storage unit 63. For example, the weighting factors of the evaluation values of the parameters that make a great contribution to the failure mode stored the most may be set to be larger. For example, in the case where the failure mode indicative of the brake dragging is stored the most, the weighting factors applied to the evaluation values of the normal value detection ratio and the variance of the attraction time period, which make a great contribution to the failure mode of the brake dragging, are set to be larger.

Thus, the weighting factors of the evaluation values of the attraction time periods, the evaluation method, and/or the table information can optimally be set in accordance with the mode of failure that occurs more. Therefore, by diagnosing the sign of the failure mode that occurs more with higher accuracy, the failure mode can effectively be reduced, and the number of occurrence of the failure mode can effectively be reduced.

Furthermore, the operation programs may be associated with corresponding prescribed operation steps in which each failure mode is diagnosed at optimal timing. The operation programs are associated with corresponding failure modes and corresponding prescribed operation steps.

For example, the operation program Prg1 is associated with a failure mode (wear abnormality) and a corresponding prescribed operation step St3. The operation program Prg2 is associated with a failure mode (dragging abnormality) and a corresponding prescribed operation step St7. The operation program Prg3 is associated with a failure mode (guide abnormality) and a prescribed operation step St10.

The abnormality diagnosis unit 62 calculates the attraction time period with high accuracy at the timing of the prescribed operation step St3 that is associated with the operation program Prg1, during execution of the operation program Prg1. The abnormality diagnosis unit 62 can diagnose the wear abnormality of the braking unit 3 with high accuracy based on the calculated attraction time period.

The abnormality diagnosis unit 62 calculates the attraction time period with high accuracy at the timing of the prescribed operation step St7 that is associated with the operation program Prg2, during execution of the operation program Prg2. The abnormality diagnosis unit 62 can diagnose the dragging abnormality of the braking unit 3 with high accuracy based on the calculated attraction time period.

The abnormality diagnosis unit 62 calculates the attraction time period with high accuracy at the timing of the prescribed operation step St10 that is associated with the operation program Prg3, during execution of the operation program Prg3. The abnormality diagnosis unit 62 can diagnose the guide abnormality of the braking unit 3 with high accuracy based on the calculated attraction time period.

As described in the foregoing, the operation programs are associated with corresponding prescribed operation steps that diagnose each failure mode at optimal dimming, so that each failure mode can be diagnosed with higher accuracy. For example, the abnormality diagnosis unit 62 may automatically calculate, based on a failure mode instructed by a user, the attraction time period in a prescribed operation step in the operation program that is associated with the failure mode, and may perform the abnormality diagnosis of the failure mode based on the calculated attraction time period. In the third embodiment, component members identical to those of the first and second embodiments will be designated by identical reference numeral to omit detailed description thereof.

Fourth Embodiment

In a fourth embodiment of the present disclosure, the abnormality diagnosis apparatus 6 may diagnose abnormality of the braking unit 3 of the robot 1 which processes various kinds of vehicles. One example of the abnormality diagnosis method will be described below. For example, the robot 1 is provided in a line for processing (such as assembling, and welding) various types of vehicles. Fed onto the line are vehicles of A, B, C, . . . and N type that are to be processed by the robot 1.

The vehicles of A type are associated with the operation program Prg1, the vehicles of B type are associated with the operation program Prg2, the vehicles of C type are associated with the operation program Prg3, . . . , and the vehicles of N type are associated with an operation program N.

Furthermore, as described in the foregoing, the operation programs Prg are associated with corresponding prescribed operation steps St in which the attraction time period is calculated at optimal timing with high accuracy. Specifically, the operation program Prg1 is associated with a prescribed operation step St3, the operation program Prg2 is associated with a prescribed operation step St1, the operation program Prg3 is associated with an operation step St7, . . . , and the operation program PrgN is associated with a prescribed operation step StN.

In the case of processing the vehicles of A type, the robot 1 executes the operation program Prg1 that is associated with the vehicles of A type. The abnormality diagnosis unit 62 of the abnormality diagnosis apparatus 6 calculates the attraction time period at the timing of the prescribed operation step St3 that is associated with the operation program Prg1. The abnormality diagnosis unit 62 diagnoses abnormality of the braking unit 3 based on the calculated attraction time period.

In the case of processing the vehicles of B type, the robot 1 executes the operation program Prg2 that is associated with the vehicles of B type. The abnormality diagnosis unit 62 of the abnormality diagnosis apparatus 6 calculates the attraction time period at the timing of the prescribed operation step St1 that is associated with the operation program Prg2. The abnormality diagnosis unit 62 diagnoses abnormality of the braking unit 3 based on the calculated attraction time period.

In the case of processing the vehicles of C type, the robot 1 executes the operation program Prg3 that is associated with the vehicles of C type. The abnormality diagnosis unit 62 of the abnormality diagnosis apparatus 6 calculates the attraction time period at the timing of the prescribed operation step St7 that is associated with the operation program Prg3. The abnormality diagnosis unit 62 diagnoses abnormality of the braking unit 3 based on the calculated attraction time period.

In the case of processing the vehicles of N type, the robot 1 executes the operation program PrgN that is associated with the vehicles of N type. The abnormality diagnosis unit 62 of the abnormality diagnosis apparatus 6 calculates the attraction time period at the timing of the prescribed operation step StN that is associated with the operation program PrgN. The abnormality diagnosis unit 62 diagnoses abnormality of the braking unit 3 based on the calculated attraction time period.

Thus, according to the fourth embodiment, in the process of manufacturing various vehicles, the attraction time period can be calculated with high accuracy at an optimal operation step corresponding to each of the operation programs, and abnormality of the braking unit 3 can also be diagnosed with high accuracy. In the fourth embodiment, component members identical to those of the first to third embodiments will be designated by identical reference numeral to omit detailed description thereof.

Although some of the embodiments have been described in the foregoing, the embodiments are merely illustrative and are not intended to restrict the scope of the disclosure. These new embodiments can be performed in other various forms, and various kinds of removals, replacements and modifications are possible without departing from the meaning of the present disclosure. These embodiments and their modifications are intended to be embraced in the range and meaning of the present disclosure, and are particularly intended to be embraced in the disclosure disclosed in the range of the claims and the equivalency thereof.

In the embodiments, the abnormality diagnosis apparatus 6 diagnoses abnormality of the robot 1. However, the abnormality diagnosis apparatus 6 is not limited to this. For example, the abnormality diagnosis apparatus 6 may diagnose abnormality of any apparatuses, such as servo pressing machines, and manufacturing facilities, which include the actuator 2 and the braking unit 3. In the case of applying the abnormality diagnosis apparatus 6 to the servo pressing machines, the attraction time period may be checked when stop operation is switched to pressing operation while the pressing operation and the stop operation are repeatedly performed. In other manufacturing facilities, the attraction time period may be checked at the timing when processing operation and stop operation are switched.

The present disclosure may implement, for example, the process shown in FIG. 5 by causing the CPU to execute a computer program.

The program may be stored in a non-transitory computer-readable medium of various types, and be supplied to the computer. The non-transitory computer-readable medium includes a tangible storage medium of various types. Examples of the non-transitory computer readable medium include magnetic recording media (for example, flexible disks, magnetic tapes, and hard disk drives), optical magnetic storage media (for example, magneto-optical disks), compact disc read-only memories (CD-ROMs), CD-Rs, CD-RWs, semiconductor memories (for example, mask ROMs, programmable ROMs (PROMs), erasable PROMs (EPROMs), flash ROMs, and random access memories (RAMs)).

The program may be supplied to the computer through a transitory computer-readable medium of various types. Examples of the transitory computer-readable medium include an electrical signal, an optical signal, and an electromagnetic wave. The transitory computer-readable medium may supply the program to the computer through a wired communication channel, such as an electric wire and an optical fiber, or through a wireless communication channel.

What is claimed is:

1. An abnormality diagnosis method of diagnosing, with an abnormality diagnosis apparatus, abnormality of a braking unit included in a prescribed apparatus, the prescribed apparatus including: the braking unit including a pressing member, an urging member that urges the pressing member toward an actuator, and an attraction device that releases an urging state of the pressing member that is pressed by the urging member; and a controller configured to control braking by the braking unit, the prescribed apparatus being configured to change operation programs each including a plurality of operation steps, the abnormality diagnosis method comprising:
calculating, by the abnormality diagnosis apparatus, an attraction time period when the prescribed apparatus executes prescribed operation steps associated with corresponding operation programs, the attraction time period being a period of time during which the attraction device attracts the pressing member;
diagnosing, by the abnormality diagnosis apparatus, abnormality of the braking unit based on the calculated attraction time period
calculating, by the abnormality diagnosis apparatus, the attraction time period when each of the operation steps in each of the operation programs is executed;
calculating, by the abnormality diagnosis apparatus, an evaluation value for evaluating accuracy of the calculated attraction time period; and
associating, by the abnormality diagnosis apparatus, as the prescribed operation step, the operation step highest in evaluation value, among calculated evaluation values in each of the operation steps included in each of the operation programs, with the corresponding operation program.

2. The abnormality diagnosis method according to claim 1, wherein when a prescribed number or more of the attraction time periods are calculated for each of the operation steps in each of the operation programs, calculating, by the abnormality diagnosis apparatus, the evaluation values of the attraction time periods.

3. The abnormality diagnosis method according to claim 2, wherein:
when the prescribed apparatus repeats the operation steps in each of the operation programs, calculating, by the abnormality diagnosis apparatus, the attraction time periods for each of the operation steps; and
calculating, by the abnormality diagnosis apparatus, the evaluation values of the attraction time periods based on a variance of the calculated attraction time periods and on a normal ratio of normal attraction time periods to all the calculated attraction time periods.

4. The abnormality diagnosis method according to claim 3, wherein calculating, by the abnormality diagnosis apparatus, the evaluation value of the attraction time period for each of the operation steps, based on: an evaluation value based on the variance and the normal ratio of the attraction time periods, and at least one of: an evaluation value based on a change amount of a command value to the actuator during the attraction time period; and an evaluation value based on the number of the attraction time periods repeatedly calculated in each of the operation steps in each of the operation programs.

5. The abnormality diagnosis method according to claim 4, wherein calculating, by the abnormality diagnosis apparatus, the evaluation value of the attraction time period by multiplying the evaluation value based on the variance of the attraction time periods, the evaluation value based on the normal ratio of the attraction time periods, the evaluation value based on the change amount of the command value, and the evaluation value based on the number of the attraction time periods by prescribed weighting factors set for respective evaluation values, and adding results of the multiplication.

6. The abnormality diagnosis method according to claim 5, further comprising:
diagnosing, by the abnormality diagnosis apparatus, an abnormality sign of the braking unit based on the attraction time period, and storing, by the abnormality diagnosis apparatus, a diagnostic result of the abnormality sign;
comparing, by the abnormality diagnosis apparatus, the diagnostic result of the abnormality sign with actual abnormality occurring in the braking unit; and
changing, by the abnormality diagnosis apparatus, at least one of: the weighting factors of the evaluation values; and an evaluation method, such that a difference between the diagnostic result of the abnormality sign and the actual abnormality decreases.

7. The abnormality diagnosis method according to claim 5, further comprising:
storing, by the abnormality diagnosis apparatus, a failure mode indicating a type of the diagnosed abnormality of the braking unit; and
setting, by the abnormality diagnosis apparatus, at least one of: the weighting factors of an evaluation values; and the evaluation method, based on the failure mode that is stored most.

8. The abnormality diagnosis method according to claim 1, further comprising associating, by the abnormality diagnosis apparatus, each of the operation programs with a corresponding failure mode indicating the type of the abnormality of the braking unit and a corresponding prescribed operation step.

9. The abnormality diagnosis method according to claim 1, wherein the prescribed apparatus is communicably connected, through a network, with the abnormality diagnosis apparatus that diagnoses abnormality of the braking unit included in the prescribed apparatus based on the attraction time period.

10. The abnormality diagnosis method according to claim 1 wherein calculating, by the abnormality diagnosis apparatus, the attraction time period based on a command current value output to the actuator from the controller.

* * * * *